(No Model.) J. T. HAWKINS. 5 Sheets—Sheet 1.
PRINTING PRESS.

No. 286,814. Patented Oct. 16, 1883.

WITNESSES: INVENTOR
John T. Hawkins
by P. R. Voorhees
Frank A. Mead ATTORNEY (No Model.)  J. T. HAWKINS.  5 Sheets—Sheet 2.
PRINTING PRESS.

No. 286,814.  Patented Oct. 16, 1883.

WITNESSES:  INVENTOR
Frank A. Mead  John T. Hawkins
by R. R. Voorhees
ATTORNEY (No Model.)  J. T. HAWKINS.  5 Sheets—Sheet 5.

PRINTING PRESS.

No. 286,814.  Patented Oct. 16, 1883.

WITNESSES:
G. A. Clements
Frank A. Mead

INVENTOR
John T. Hawkins
by R. R. Voorhees
ATTORNEY

UNITED STATES PATENT OFFICE.

JOHN T. HAWKINS, OF TAUNTON, MASSACHUSETTS.

PRINTING-PRESS.

SPECIFICATION forming part of Letters Patent No. 286,814, dated October 16, 1883.

Application filed November 15, 1882. (No model.)

*To all whom it may concern:*

Be it known that I, JOHN T. HAWKINS, of Taunton, in the county of Bristol and State of Massachusetts, have invented a new and useful Improvement in Sheet-Delivering Mechanism for Printing-Presses, which improvement is fully set forth and illustrated in the following specification and accompanying drawings.

The object of the invention is to deliver printed sheets from a cylinder printing-press with their last-printed sides upward in an even pile upon a receiving board or table without the use of tapes and without contact of the last-printed side with fly-fingers or anything tending to smut the work, and also to save the space usually occupied by a fly-table exteriorly to the press, and to leave the back of the press under the feed-board clear for easy access to the form.

The invention consists of mechanism, specifically set forth in the claims, arranged so as to take the sheet from the cylinder-grippers (generally at the back of the press under the feed-board) by the grippers of a delivery-cylinder, or of a series of delivery-pulleys or short cylinders, and convey it over said delivery-pulleys or short cylinders under a pair of pressure-wheels until the head of the sheet reaches a position nearly on the bottom of said pulleys or short cylinders, when said head is seized and its motion arrested by a series of oscillating grippers, and by them slowly conveyed downward into proximity to the receiving-board, during which time the tail of the sheet is rolled out from under said pressure-wheels, and thereafter spread or flattened out upon the receiving-board by a series of air-jets, and the final delivery of the sheet completed by its release by the oscillating grippers, the delivery-pulleys being generally under and the pressure-wheels always over unprinted margins or lines through the sheet.

Figure 1:
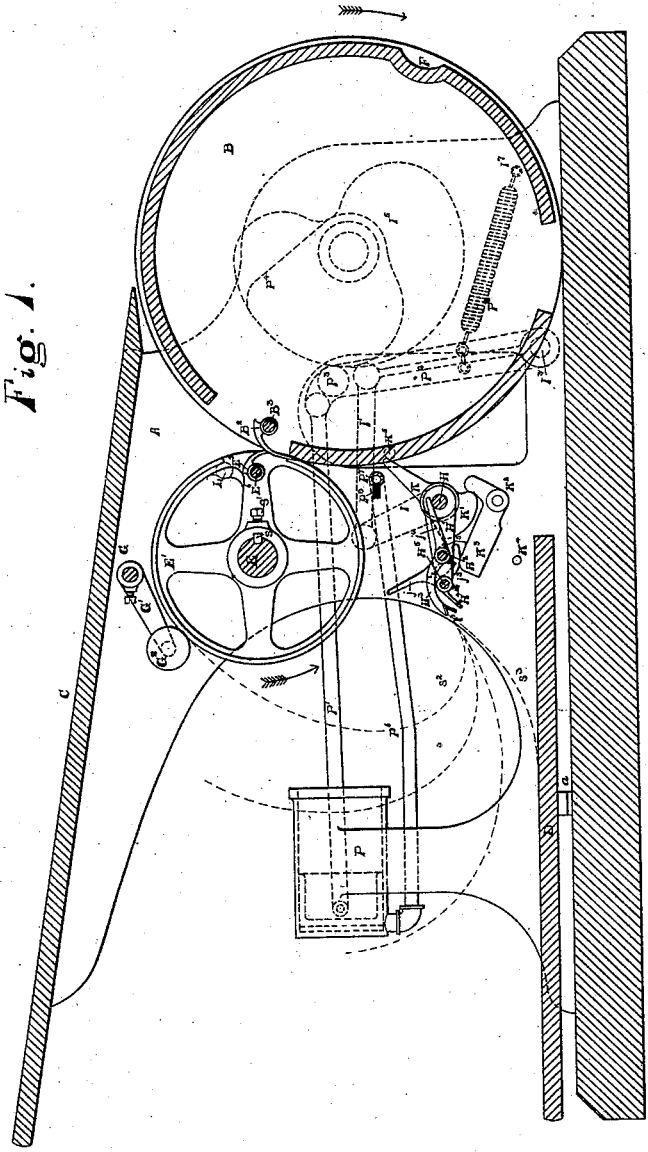
Figure 2:
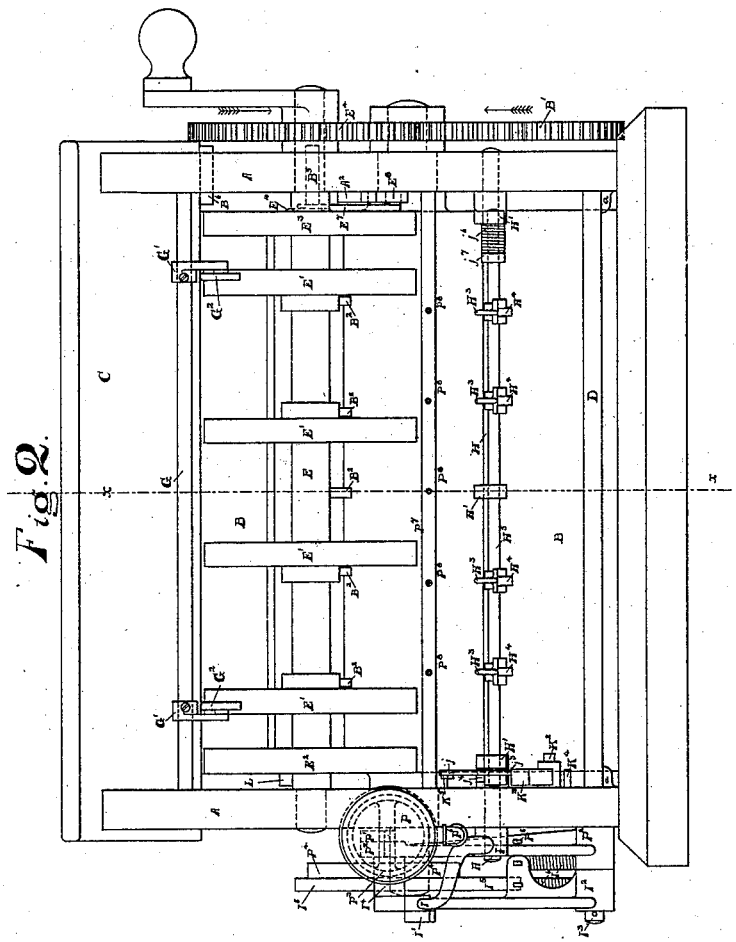
Figure 3:
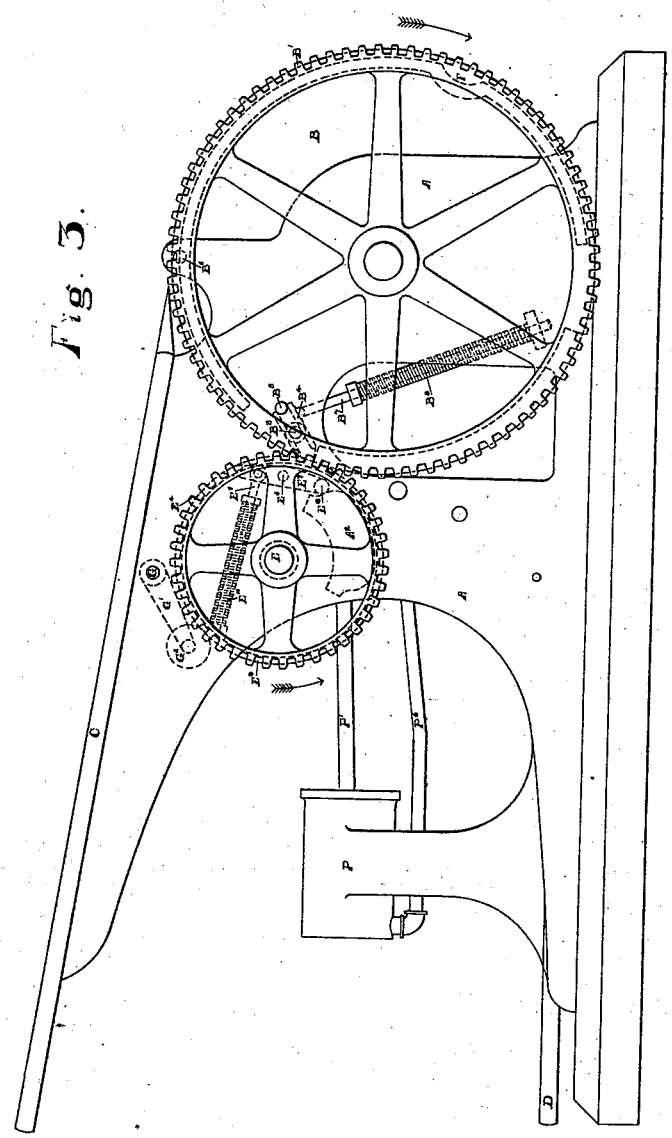
Figure 4:
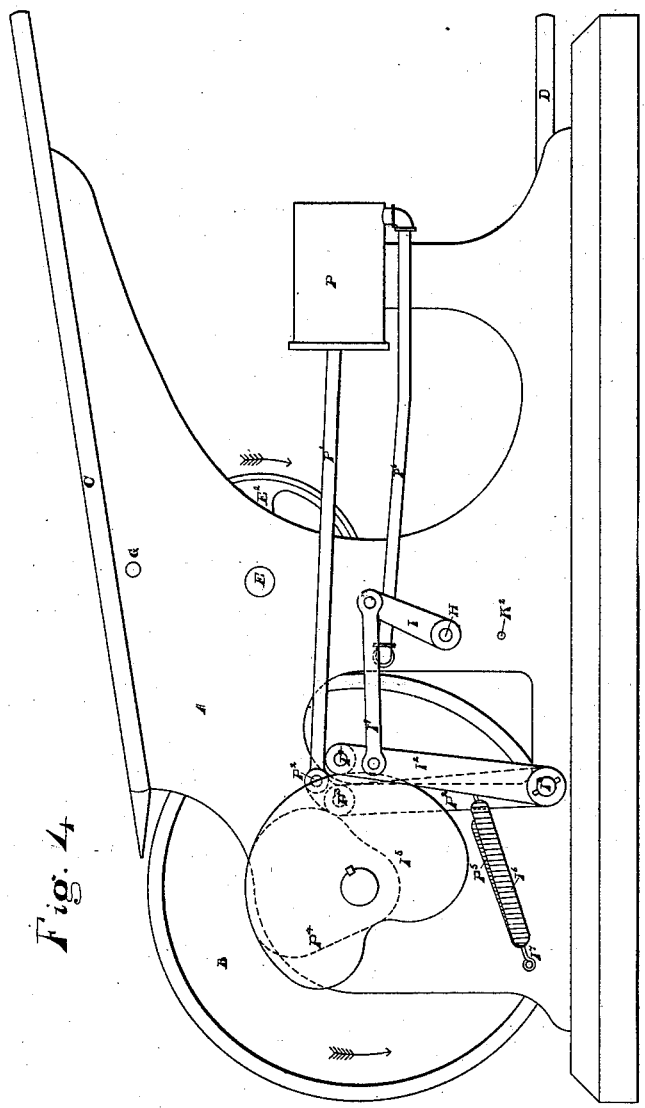
Figure 5:
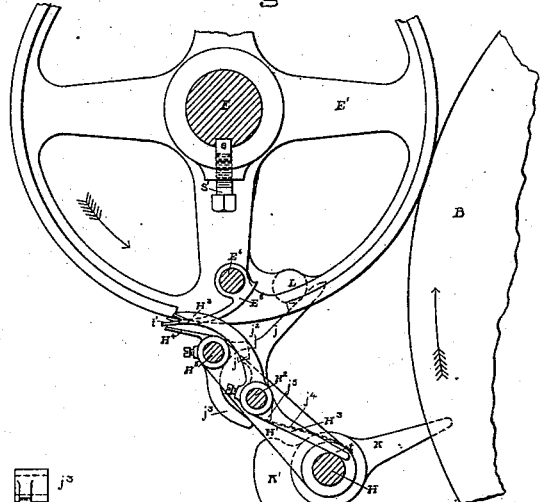
Figure 8:
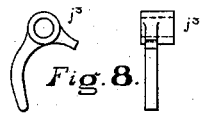
Figure 7:
Figure 10:
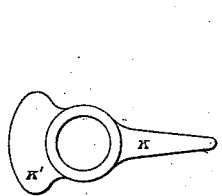
Figure 9:
Figure 11:
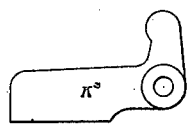
Figure 6:
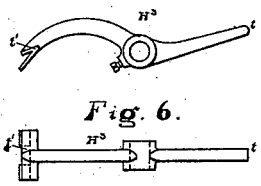

In the accompanying drawings, Figure 1 represents a sectional side elevation, and Fig. 2 an end elevation, of such portions of a cylinder printing-press as are involved in my invention, the section Fig. 1 being taken through line $x$ $x$ of Fig. 2. Fig. 3 is a side elevation of the machine. Fig. 4 is a side elevation of the machine, taken from the left-hand side of Fig. 2. Fig. 5 is an enlarged elevation, partly in section, of the mechanism effecting the opening and closing of the oscillating grippers. Figs. 6, 7, 8, 9, 10, 11 are two detail views each of the several parts of the oscillating-gripper mechanism.

In said drawings, the letters A A indicate the side frames, in which is journaled the impression-cylinder B.

C indicates the feed-board, and D the receiving-board, supported upon lugs $a$ $a$ upon the side frames in such position as to clear the type or form as it runs under it, and generally not extending beyond the other limits of the machine. The shaft E is journaled in the frames A, and carries a series of pulleys or short cylinders, E', adjustably secured to the shaft E by the key S and set-screw S', and two similar end pulleys, $E^2$ $E^3$, permanently secured to the shaft E by suitable keys.

The drawings represent a press whose impression-cylinder makes but one revolution to each impression, and the impression-cylinder B is geared to the shaft E by the spur-wheels B' and $E^4$ in the proportion of two to one, the cylinder B and pulleys E' being of diameters bearing to each other the same proportion. As this mechanism is adaptable, however, to any of the other well-known forms of cylinder printing-presses—as the two-revolution or three-revolution presses—the delivery-pulleys may be made of any proportion to the impression-cylinder that may be best suited to the given form or type of press, and geared to each other accordingly, it being only essential that the peripheries of the cylinder B and the pulleys E' have equal velocities and that the grippers of the delivery pulleys E' shall meet the grippers of cylinder B at their point of nearest approach at each delivery revolution of the impression-cylinder B. The usual cylinder-grippers, $B^2$, for seizing the sheet as fed from the feed-board C and conveying it through the impression, are carried upon the shaft $B^3$, journaled in the cylinder B, and are operated by the well-known tumbler-cam $B^4$, the opening-stud $B^5$, closing-stud $B^6$, and the rod and spring $B^7$ and $B^8$; but any other suitable mechanism may be employed therefor. The grippers $E^5$— one to each of the delivery-pulleys E'—are carried upon a gripper-shaft, $E^6$, journaled in delivery-pulleys E' and the end pulleys, E² E³. On that end of gripper-shaft E⁶ which is journaled in the end pulley, E³, is secured a lever, E⁷, carrying on one of its arms a roller, E⁸, its other arm serving as a stop against the inside of the rim of the end pulley, E³, and attached to which is a rod, E⁹, and spring E¹⁰, for closing the grippers, as allowed by the cam A² and roller E⁸.

Attached to one frame, A, adjoining the end pulley, E³, is a cam, A², (shown in Fig. 2, and in dotted outline in Fig. 3,) of proper shape and position to open and close the grippers E⁵ at the proper points and maintain them open between opening and closing, as hereinafter described. The cam A² being stationary, and pulleys E' E² E³ making two revolutions to one of cylinder B, a gap, F, is cast or formed in that part of the cylinder B opposite the gripper-edge not within the impression-surface, to allow the grippers E⁵ to pass into it on the non-delivery revolution of the pulleys E'. Where desirable, however, the cam A² may be made movable and in parts, so as to cause the grippers E⁵ to open only on each second revolution. The parts so far described are well known and form no part of my invention, except the position of the receiving-board in relation to the mechanism about to be described.

G is a stretcher-rod secured to the frames A A, having adjustably secured thereto two or more arms, G', each carrying a small pressure-roller, G². Two of the pulleys E' are to be so placed as to lie under the unprinted edges or margins of the sheet and the pressure-pulleys G², so as to rest upon the back of the sheet and to press sufficiently upon the same parts of the sheet as to hold it from dropping from under them by its own weight while being held by its head edge by the oscillating grippers, as hereinafter shown. Any two of the pulleys E' may thus be placed under the margins of the sheet and the others carried between them, as shown, or not, as may best suit the work and paper. The shaft H, journaled in the frames A A, carries three arms, H'. H² is a small shaft carried in the arms H', having adjustably secured thereto, and forming the upper jaw of a series of oscillating grippers, the arms H³. The tail ends t of the arms H³ rest upon shaft H to fix their position. At the jaw ends of arms H³ is a flanged V-shaped notch, t', cut away on the under side at the center to admit of the entrance of arms H⁴, forming the under jaw of the series of oscillating grippers. The shaft H⁵ is journaled in the arms H', having adjustably secured thereto the arms H⁴. The arms H' are keyed or otherwise secured permanently to the shaft H, and the shaft H² is also permanently secured in arms H', but the shaft H⁵ works freely in the arms H', as hereinafter shown. The shaft H has secured to it at its end outside of the frame A, at the left, Fig. 2, an arm, I, and pivoted to it is a connecting-rod, I', which in turn is pivoted to a lever, I², whose lower end is pivoted upon a stud, I³, projecting from the frame A. The upper end of the lever I² carries a roller, I⁴, engaging a cam, I⁵, secured to the axis of cylinder B. A spring, I⁶, with one end secured to the lever I² and the other to a stud, I⁷, projecting from the side frame, A, serves to keep the roller I⁴ in contact with the cam I⁵, and cam I⁵ is so shaped as to give to the shaft H and its attachments the necessary oscillating motion and to hold it in the positions at rest at either extreme the necessary time.

Pivoted loosely upon the shaft H² is an arm, j, carrying upon one of its edges two notches, j' j², and secured to the shaft H⁵ is a double-armed lever, j³, whose shorter arm engages the notches j' j² of the arm j. Said arm is held in contact with the short arm of the lever j³ by a spring, j⁴, fastened to the hub of H, and projecting under a shoulder, j⁵, of the arm j. The notches in arm j⁵ are so placed that when the short arm of j³ is in notch j' the jaws H⁴ and t' of arm H³ are in contact; but when in notch j² of arm j the jaw H⁴ is open, as shown in Figs. 1 and 5. The shaft H⁵ has upon its right-hand end, Fig. 2, a spring, j⁶, and collar j⁷, so adjusted as to tend to rotate the shaft H⁵ and its jaws H⁴ in the direction to close and hold closed the jaws H⁴ upon the jaws t' of arms H³.

Pivoted loosely upon shaft H is an arm, K, carrying upon its opposite end a counter-weight, K'. Upon a stud, K², projecting from the inside of frame A, is a bell-crank lever, K³, whose vertical arm engages the under side of the counter-weight K' of lever K, and whose horizontal arm forms a counter-weight to keep it in position upon the stop-pin K⁴, projecting from frame A, except when lifted from it by the action of lever K K'. Upon the edge of the cylinder B, in proper position to operate the lever K at the right time to open the jaws H⁴, is a pin, K⁵, which engages the end of the lever K, which in turn moves the vertical arm of the lever K³, and this latter, in the position shown in Fig. 1, engages the long arm of lever j³, throwing the short arm from notch j' to notch j² of lever j, and leaving the jaws H⁴ open, as held by notch j² of lever j. Upon the passage of pin K⁵ past the point of lever K the counter-balance forming the horizontal arm of lever K³, being the heavier of the two, brings the levers again in position, with K³ resting upon the stop-pin K⁴, and the counter-balance K' of lever K resting upon the vertical arm of the lever K³. The object of this construction of the levers K³ and K is that, should the press be turned backward, the pin K⁵ engaging the upper side of lever K, the latter will be free to rotate out of the way without fracture of any of the parts and be returned to its proper position by the counter-weight K'.

Secured to the face of end pulley, E², is a pin, L, which, when the parts are in the position shown in Fig. 5, engages the free end of lever j, and allows the spring j⁶ to close the jaws H⁴ by causing the short arm of lever j³ to pass from notch $j^2$ to notch $j'$. Simultaneously with this the roller $E^8$, by engaging the cam $A^2$, opens the delivery-grippers $E^5$, and the edge of the paper, having passed into the flanged V-shaped notch $t'$ of arm $H^3$, is firmly grasped by the jaws $H^4$ and held, by means of spring $j^6$, until again released by the action of pin $K^5$ upon lever $K$, after the arms $H'$ and their attached mechanism reach the lower position shown in Fig. 1. Thus $K'$ upon $K^3$ and $K^3$ upon the long arm of $j^3$ operate to again open them by causing the short arm of $j^3$ to pass from notch $j'$ to notch $j^2$ of lever $j$.

P indicates a valveless air-pump with a single acting plunger. (Shown in dotted lines, Fig. 1.) To said plunger is articulated the connecting-rod $P'$, which is likewise articulated at its other end to the free end of a second lever, $P^2$, pivoted at its lower end upon the stud $I^3$. The lever $P^2$ carries a roller, $P^3$, which engages a cam, $P^4$, secured to the axis of cylinder B. The spring $P^5$ serves the same purpose for the lever $P^2$ as spring $I^6$ does for the lever $I^2$, and is secured to the same stud $I^7$. The pipe $P^6$ leads from the bottom of the pump P to a pipe, $P^7$, extending from frame to frame A A, and secured thereto. At proper intervals, and in such position as to project streams of air in a nearly horizontal direction, small jet-tubes $P^8$ are inserted in the pipe $P^7$. By the mechanism just described jets of air are at the proper time projected from jet-tubes $P^8$ by means of the cam $P^4$, and the spring $P^5$, by causing the roller $P^3$ to fall to the lower part of cam $P^4$, allows the pump P to refill itself through the jet-tubes $P^8$. The delivery-pulleys $E'$ may be made in the form of a continuous cylinder, with suitable gaps cut in it for the entrance of the jaw $t'$ of lever $H^3$, if thought more suitable for special kinds of work.

The cylinder-grippers $B^2$ take the sheet from the feed-board C, holding it until released, at the position shown in Fig. 1, by the action of the opening-stud $B^5$ and tumbler-cam $B^4$. At this point the grippers $E^5$ of the delivery-wheels $E'$ reach the proper position, and through the cam $A^2$ and spring $E^{10}$ close upon the paper, the grippers $B^2$ and $E^5$ being so spaced across the press as to pass each other. The grippers $E^5$ now carry the head of the sheet to the position shown in Fig. 5, the pressure-wheels $G^2$ holding the sheet in contact with the two of pulleys $E'$, which may have been placed under the unprinted margin of the sheet. Upon the arrival of the grippers $E^5$ at the position shown in Fig. 5 the roller $E^8$ enters upon the cam $A^2$ and opens the grippers $E^5$. Simultaneously the roller L on end pulley, $E^2$, engages the free end of the lever $j$, causing the short arm of lever $j^3$ to pass from notch $j^2$ into notch $j'$, and allowing spring $j^6$ to close the arms or grippers $H^4$ upon the upper sides of the V-shaped notches $t'$ of the arms $H^3$, the head of the sheet having simultaneously passed into the V-shaped notch $t'$ of the arm $H^3$, its end motion being arrested thereby. At this juncture the roller $I^4$ commences to pass from the depression in the cam $I^5$, causing the shaft H to carry its attached mechanism slowly downward toward the receiving-board D, while the sheet is rolled out at a much faster rate from between the margin-pulleys $E'$ and pressure-wheels $G^2$, bringing the sheet into some such position as indicated by the dotted lines $S^2$, Fig. 1. The concentric part of cam $I^5$ holds the head of the sheet in this position until the tail has passed from under the pressure-wheels $G^2$. Just as the tail of the sheet has passed from under said pressure-wheels the cam $P^4$ causes the air-pump P, through the mechanism already described, to force jets of air against the suspended sheet, spreading it out flat upon the receiving-board D, grippers $E^5$ having meanwhile passed by cylinder B on the non-delivery revolution and entered the gap F, (as opened by the cam $A^2$.) The concentric part of cam $I^5$ is long enough to hold the head of the sheet at rest a sufficient time, with the oscillating grippers in the position shown in Fig. 1, to allow the sheet to be entirely spread out upon the receiving-board, as indicated by the dotted lines $s^3$, Fig. 1. At this time the pin $K^5$ reaches the lever K, and, as before, trips the jaws or grippers $H^4$ open by throwing the short arm of lever $j^3$ from notch $j'$ to notch $j^2$ of lever $j$, and immediately thereafter the roller $I^4$ begins to pass toward the low part of cam $I^5$, allowing the spring $I^6$ to bring the oscillating grippers again to the position shown in Fig. 5 to receive the next sheet, the air-pump P having meanwhile become refilled preparatory to the expulsion of air for spreading the next sheet.

Having thus fully described my said invention, I do not claim any part of the mechanism above described by means of which the sheet is taken from the impression-cylinder B by a series of grippers, $E^5$, upon delivery-pulleys $E'$, or that for opening and closing the grippers used, as such mechanisms are well known; but,

As of my invention, I claim—

1. In a cylinder printing-press, in combination with its impression-cylinder and an auxiliary delivery cylinder or cylinders provided with grippers for taking the head of the sheet from the impression-cylinder, a series of oscillating grippers situated under the delivery cylinder or cylinders for taking the sheets therefrom, whereby the head of the sheet is grasped by said grippers, arrested in its motion, conveyed downward in proximity to a receiving-board, and held until the sheet is suitably flattened out thereon, when its head is released to complete the sheet's delivery, substantially as set forth.

2. In a cylinder printing-press, in combination with its impression-cylinder and an auxiliary delivery cylinder or cylinders provided with grippers for taking the head of the sheet from the impression-cylinder, a series of oscillating grippers situated under the delivery cylinder or cylinders for taking the sheets therefrom, and means for forcing a series of air-jets over or upon the sheet, as described, whereby the head of the sheet is grasped by said grippers, arrested in its motion, conveyed downward in proximity to a receiving-board, and held until the sheet is spread or flattened out thereon by said air-jets, when its head is released to complete the sheet's delivery, substantially as set forth.

3. In a cylinder printing-press, in combination with its impression-cylinder and an auxiliary delivery cylinder or cylinders provided with grippers for taking the head of the sheet from the impression-cylinder, a series of oscillating grippers situated under the delivery cylinder or cylinders for taking the sheets therefrom, means for forcing a series of air-jets over or upon the sheet, as described, and a series of pressure-pulleys running upon said delivery cylinder or cylinders, all arranged, combined, and operating in the manner described, for the purposes set forth.

4. In a printing-press, a series of oscillating grippers constructed with an upper jaw formed into a wide flanged V-shaped groove, serving as a stop to the progress of the sheet, and with a lower jaw as a narrow finger to enter a slot of the lower flange of the V-shaped upper jaw, whereby the paper is clamped between said narrow finger and the upper side of said V-shaped jaw, substantially as and for the purposes set forth.

5. The mechanism for opening and closing the oscillating grippers, consisting of the notched lever $j$, levers $j^3$, K, K', and K$^3$, the pin K$^5$ and roller L, and springs $j^4$ $j^6$ and stop-pin K$^4$, all operating substantially as and for the purposes set forth.

JOHN T. HAWKINS.

Witnesses:
    JOS. R. TALLMAN,
    ELISHA T. JACKSON.